April 12, 1932.　　E. F. W. ALEXANDERSON　　1,853,021
MEANS FOR ELIMINATING FADING
Filed Nov. 15, 1927
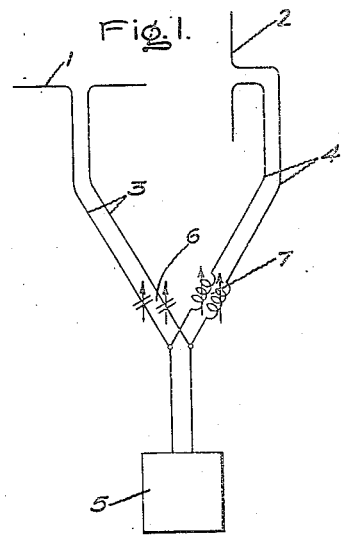
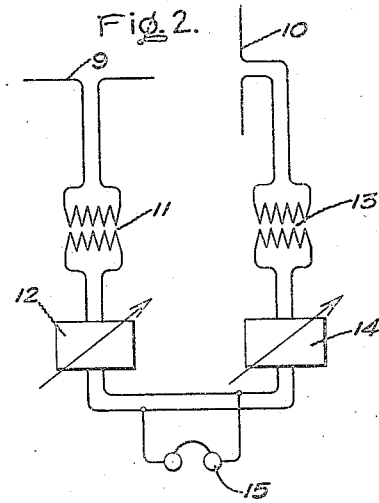
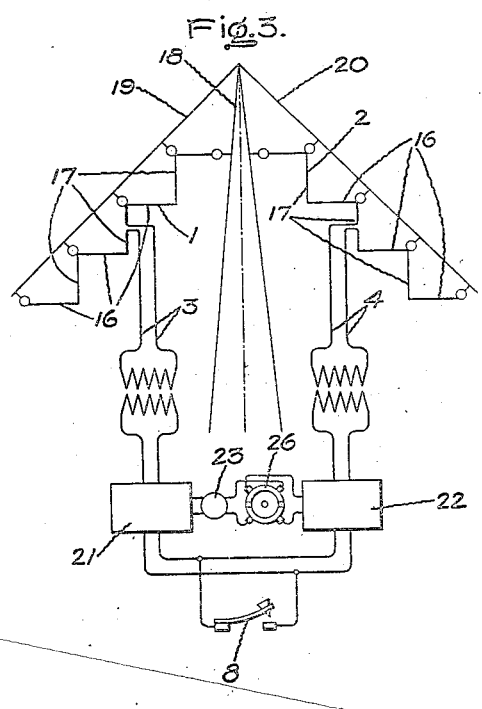
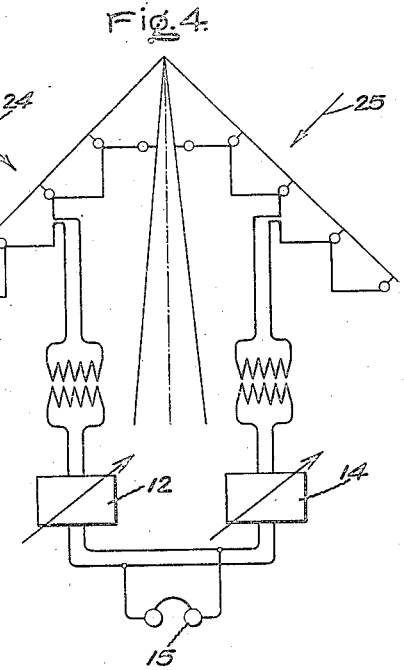
Inventor:
Ernst F. W. Alexanderson
by
His Attorney Patented Apr. 12, 1932

1,853,021

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

MEANS FOR ELIMINATING FADING

Application filed November 15, 1927. Serial No. 233,508.

My present invention relates to radio signaling systems employing short wave lengths and more particularly to a method and means for eliminating fading in such systems.

As a result of observations it has been shown, when two receivers are made to respond, one to waves having a predominant polarization in a certain plane and the other to waves having a predominant polarization in a different plane, that the periods of fading do not occur simultaneously in the different receivers but rather that they more frequently occur alternately. This I attribute to changes in the plane of polarization of the received wave. This seems to be borne out by the fact that it has been shown that a wave emitted by a horizontal loop may produce a response in receivers situated at different distances from the antenna indicating a continuously twisting plane of polarization together with alternate points of plane and circular polarization and intermediate points of elliptical polarization.

These phenomena together with others which have been variously observed seem to indicate that the condition of polarization of the wave as it passes through space is continually changing and I have been led to believe that the phenomenon of fading is a result of this shifting of the condition of polarization of the transmitted waves. I have accordingly designed a system in which radio signaling may be effected by means of waves having a circular or elliptical polarization, or a rapidly changing plane of polarization. As a part of this system I may employ an antenna adapted in itself to transmit waves having a polarization in a certain plane and a second antenna adapted to transmit waves having a polarization in a plane at an angle to the plane of polarization of the wave transmitted by the first antenna, the space relation between the antenna and the phase relation of the currents with which they are excited being such that a circular wave is produced. As an alternative I have provided means whereby waves having a polarization in different planes alternately may be employed.

At the receiving station I provide a similar system of antennæ these antennæ being disposed substantially at right angles to each other and each being adapted to respond to waves having a predominant polarization in a certain plane. Each of these antennæ have associated therewith a detector the output currents of which are caused simultaneously to actuate a common receiving apparatus. With the apparatus as thus arranged if it should occur that fading be pronounced in a certain plane, waves having a polarization in a different plane will still effect the receiving apparatus and also if there be no fading in either plane, the transmitted circularly polarized waves or waves having a rapidly changing plane of polarization will effect both of the receiving antennæ and the receiving apparatus will respond to currents set up in both of these antennæ.

The novel features which I believe to be characteristic of my invention will be set forth with particularity in the appended claims. My invention itself, however, both as to its organization and method of operation together with further objects and advantages thereof may best be understood by reference to the following description taken in connection with the accompanying drawings in which Figs. 1 and 3 represent particular forms of apparatus which I may employ at the transmitter, and Figs. 2 and 4 represent apparatus which I may employ at the receiver.

Referring to Fig. 1 of the drawings, 1 represents an antenna which in itself is adapted to transmit horizontally polarized waves. This antenna may be constructed in a manner which has been fully set forth in my copending application, Serial No. 29,210, filed May 9, 1925, Radio signalling system and comprises in the illustration a simple horizontal doublet. 2 represents a similar vertical antenna adapted to transmit vertically polarized waves. These antennæ may be of any suitable construction but for purposes of illustration are shown as comprising a single conductor having a length equal to substantially half of the wave length of the wave to be radiated and which are located respectively in the horizontal and vertical planes. Both of these antennæ are excited with high frequency currents which are supplied thereto at substantially the midpoint thereof, through feeder lines 3 and 4 respectively, which are connected in the output circuit of a high frequency transmitter 5. This transmitter is adapted to supply to its associated antenna currents having a desired frequency through suitable phase adjusting means 6 and 7 which are represented as series connected capacitance in the line 3 and inductance in the line 4. The phase relations between the currents in the two antennæ may be adjusted and maintained as desired by this variable inductance and capacity.

In Fig. 2 I have shown antennæ 9 and 10 both of which may be constructed similarly with the antennæ 1 and 2 of Fig. 1, these antennæ being disposed at right angles to each other, one in a horizontal plane and the other in a vertical plane. The antenna 9 is adapted to respond to oscillations in the horizontal plane and to supply currents so received through a transformer 11 to a suitable detector 12. Likewise the antenna 10 is adapted to respond to oscillations in the vertical plane and to supply currents so received through a transformer 13 to a suitable detector 14. 15 represents any suitable receiving apparatus which may be associated with the output circuits of both of these detectors and which may respond to either of them independently of the other, or to both.

With the apparatus as thus shown and described, if the antenna 2 be excited with currents which are displaced in phase by 90 degrees with respect to the currents with which antenna 1 is excited, waves will be transmitted which have a circular or elliptical polarization. If it should occur at a certain time interval that fading be pronounced with waves having a vertical polarization horizontally polarized waves may still reach the receiving apparatus. To these antenna 9 will respond supplying high frequency currents to the detector 12 causing a response in the receiving apparatus 15. During a succeeding interval fading may be pronounced with waves having a polarization in the horizontal plane. During this time vertically polarized waves may still reach the receiving apparatus. To these antenna 10 will respond supplying high frequency currents to the detector 14 and producing a response in the indicating apparatus. If no fading occurs in either plane then the antenna 10 will respond to oscillations in the vertical plane and the antenna 9 will respond to oscillations in the horizontal plane and both detectors 12 and 14 will supply signalling currents to the receiving apparatus 15.

In Fig. 3 I have shown another form of transmitting apparatus which may be employed as a part of my invention including antennæ 1 and 2 of a form more fully set forth and described in Patent No. 1,775,826 to Samuel P. Nixdorff, issued September 26, 1930. Each of these antennæ 1 and 2 comprise a plurality of alternately arranged sections 16, 17 the sections 16 being disposed in a horizontal plane and the sections 17 in a vertical plane. Each of these sections have a length equal to one half of the length of the wave which is to be radiated and they are preferably arranged in a zigzag or staircase formation upon opposite sides of a supporting member, such as a tower 18, from which they are suspended by means of additional members 19 and 20. The general arrangement of the antennæ, as shown, comprises that of a triangle. The antenna may be supplied with high frequency currents as set forth in connection with Fig. 1 in which case a circular polarized wave will be projected in a direction broad side to the plane of the antenna. By way of illustrating a further means for energizing the antennæ 1 and 2 of Fig. 3 transmitters 21 and 22 are illustrated each of these being associated with the antennæ 1 and 2 through suitable transformers connected in the lines 3 and 4 respectively. These transmitters are adapted to operate at the same frequency and with a desired phase relation between their output currents. The synchronism and phase relation of the two transmitters may be controlled by any suitable master control device 23. This control device may include a crystal of ordinary type which may be utilized to control the frequency of the transmitters 21 and 22, or may include any suitable oscillation generator for supplying to the transmitters 21 and 22 currents which may be amplified and employed to excite the antennæ. It will also include suitable phase adjusting means such, for example, as that shown at 6 and 7 in Fig. 1 for securing a proper phase relation between the antennæ currents. The transmitters may be controlled in accordance with desired signals by any suitable device such as a telegraphic key 8.

In Fig. 4 I have shown a receiving system employing a similar type of antennæ. Each of these antennæ will in itself produce a maximum response in the receiver 15 when waves are received having a polarization in a plane at right angles to the direction of the antenna as is indicated by the arrows 24 and 25 but either antenna will also respond to waves having either a vertical or horizontal polarization. Thus, for example, if waves having a horizontal polarization are received the horizontal members of both antennæ will operate in phase to supply currents to the receiving device, whereas no response will be produced by the vertical members. Likewise if vertically polarized waves are received the vertical members will respond in phase whereas no response will be produced by the horizontal members. The antenna shown in this figure will, of course, be arranged in a plane at right angles to the direction of propagation of the received wave.

An alternative method of operation is possible with an arrangement of antenna such as that shown in any of the figures. For example, it may be desirable instead of effecting communication by means of circularly polarized waves to utilize waves having plane polarization which may be changed as desired. This may be effected if desired, by switching means which may be utilized to alternately connect each of the antenna of any of the figures to the associated high frequency apparatus. This is true with respect to the receiver as well as the transmitter. The means whereby the plane of polarization may be changed is particularly simple in the arrangement shown in Fig. 3 since the only additional equipment necessary is a reversing switch 26 connected preferably in the leads extending from the master control device 23 to one of the transmitters whereby the current in the antenna 2 may be reversed in phase. A similar result may be had by connecting the reversing switch in the antenna leads 4. If the phase controlling device 23 is so adjusted that both of the antennæ are excited in phase then the currents in all of the horizontal members will be in phase and will cooperate to project a wave having a horizontal plane of polarization, whereas the vertical members of the antenna 2 will be opposed to the vertical members of the antenna 1 with the result that the effects of the vertical members in a direction at right angles to the plane of the antenna will be neutralized. If now the currents in the antenna 2 be reversed in phase then the currents in the vertical members of the two antennæ will be in phase and will cooperate to project a wave having a vertical plane of polarization, whereas the currents in the horizontal members of the antenna 1 will oppose those of the horizontal members of the antenna 2 and the effects of all of the horizontal members will be neutralized. Thus by the mere utilization of a reversing switch 26 in the manner described this result may be effected and either horizontally or vertically polarized waves may be transmitted as desired depending upon the nature of the response which is had at the receiver 15. This may be particularly advantageous where it is found that the fading is of a particular nature during certain hours of the day. Thus it may occur that during a certain period of the day fading is pronounced in the horizontal plane, whereas during a different period of the day it is pronounced in a different plane. By means of the switch 26 the plane may be chosen which will produce a maximum response at the receiver 15. If desired the reversing switch 26 may be driven by a motor whereby the phase relation of one of the antennæ with respect to the other will be rapidly reversed, and consequently the plane of polarization will be rapidly changed from one plane to another. In this way the elimination of fading may be expected for the reasons pointed out in connection with the transmission of circularly polarized waves. Where more rapid reversals are desired electrical means may be employed for effecting a phase modulation of the currents in either one or both of the antennæ. Thus currents from the device 23 may be supplied to the transmitters 21 and 22 through suitable phase modulators whereby the phase of the currents in both antennæ may be simultaneously shifted through ninety degrees thereby effecting a total displacement of one hundred and eighty degrees between the currents in the two antennæ.

While I have particularly mentioned antennæ disposed in planes at 90 degrees to each other and a 90 degree phase displacement between the exciting currents of the two antennæ, it will, of course, be understood that I do not wish to be limited thereto, since the antennæ may be disposed at any angle with respect to each other, the phase relations of the currents in the two being accordingly adjusted to produce a circular polarization. Likewise while I have shown only a pair of antennæ it will, of course, be understood that any number of these may be used, these being arranged at diverse angles to each other and at different locations as is desired. This may be particularly advantageous in connection with the receiving apparatus. I further wish it to be particularly noted while I have shown a particular type of transmitting mechanism in connection with my invention that a substantial reduction of fading has been found when the waves have been transmitted in the customary way and only the receiving mechanism herein disclosed has been employed. I therefore fully contemplate the use of my receiving apparatus independently of any particular type of transmitting equipment as well as in combination with the transmitting equipment as herein set forth.

I have shown the detectors 12 and 14 as being adjustable as is indicated by the arrows which have been drawn therethrough. By adjustment of the volume of output of these detectors reception may be had in the plane in which static is a minimum. For example, if both antennæ are responding to oscillations in their respective planes, whereas static is present only in, for example, the horizontal plane the volume of output from the detector 12 may be reduced until static no longer appears to an annoying degree in the receiver. Corresponding adjustments may be made when static is more pronounced in the vertical plane. Thus with the arrangement as herein described not only fading may be eliminated but also means are afforded whereby static may likewise be reduced.

In this specification and in the claims I have particularly mentioned the use of circularly polarized waves. Since the same result may be effected by elliptically polarized or irregularly polarized waves I wish it to be understood that I fully contemplate the use of such and that I regard such use as fully within the terms of the appended claims.

While I have shown and described particular embodiments of my invention it will of course be understood that I do not wish to be limited thereto, since many modifications, both in the circuit arangement and in the instrumentalities employed, may be made without departing from the spirit and scope of my invention as set forth in the appended claims.

What I claim as new and desire to secure by Letters Patent of the United States is:

1. In combination, an antenna having a plurality of alternately arranged members disposed in different planes, a second antenna having a plurality of members similarly arranged in planes parallel to said first mentioned planes, means including high frequency apparatus associated with both of said antennæ whereby certain members of both of said antennæ cooperate in a certain plane and means whereby certain other members of both of said antennæ cooperate in a different plane.

2. An aerial system comprising a pair of antennæ, each of said antennæ comprising a plurality of sections, means for supplying high frequency current to said antennæ, the arrangement of said antennæ being such that certain sections of both antennæ cooperate to project a wave having a predominant polarization in a certain plane and means for causing certain other sections of said antennæ to cooperate to project a wave having a predominant polarization in a different plane.

3. In combination, an antenna comprising a plurality of series connected sections including alternately arranged sections separated by intermediate sections, the alternately arranged sections of said antenna being in parallel planes and extending in opposite directions from the intermediate sections thereof in zigzag formation, a second similar antenna having sections arranged in parallel relation with said first antenna, said two antennæ being arranged in a common plane and in a general triangular formation in said plane, means for supplying currents having a certain phase relation to said antennæ and means for reversing the phase relation between said currents.

4. In combination, an aerial conductor arranged to radiate waves having polarization in both the vertical and horizontal planes, and means selectively to neutralize the radiation from said aerial conductor which is polarized in either of said planes whereby radiation may be produced having predominant polarization in a selected one of said planes.

5. In combination, a plurality of aerial conductors, each of said conductors being arranged to radiate waves having polarization in each of two planes at substantially right angles to each other, said antennæ being so arranged with respect to each other that the radiation from the different conductors polarized in one of said planes cooperate with each other whereas the radiation from the different conductors polarized in the other plane oppose, and means to cause the radiation from the different conductors polarized in said one plane to oppose and the radiation from the different conductors polarized in said other plane to cooperate.

6. In combination, a plurality of aerial conductors, said aerial conductors being arranged to cooperate with respect to waves polarized in a certain plane and to oppose each other with respect to waves polarized in a different plane, and means for causing said conductors to oppose each other with respect to waves polarized in said certain plane and to cooperate with respect to waves polarized in said different plane.

In witness whereof, I have hereunto set my hand this 14th day of November, 1927.

ERNST F. W. ALEXANDERSON.